UNITED STATES PATENT OFFICE.

RALPH H. McKEE, OF NEW YORK, N. Y.

PROCESS OF PRODUCING PECTIN.

1,380,572.  Specification of Letters Patent.  Patented June 7, 1921.

No Drawing.  Application filed April 29, 1919. Serial No. 293,535.

*To all whom it may concern:*

Be it known that I, RALPH H. McKEE, a citizen of the United States, residing at New York city, in the county of New York and State of New York, have invented certain new and useful Improvements in Processes of Producing Pectin, of which the following is a specification.

This invention relates to a process of making pectin which is the so-called vegetable gelatin to which the jellylike character of ordinary fruit jellies, jams, and marmalades is due.

The primary object of my invention is to provide an improved process of producing pectin whereby prior processes are simplified, cheapened and an improved product obtained.

In the preferred practice of my process, apple peelings and about an equal weight of water are heated under pressure in a suitable vessel, preferably a steam jacketed vessel, to a temperature materially above 100° C., and preferably to a temperature of approximately 125° C. This temperature is maintained preferably constant for some minutes, preferably thirty minutes, the exact period depending on the condition of the fruit.

The resulting mush is run into the perforated basket of a centrifugal machine in which the fibrous material is fairly completely separated from the solution. The resulting solution is then evaporated at a pressure less than atmospheric pressure, preferably in a vacuum pan or multiple effect evaporator to a desired density. The solution is then clarified as by the use of a high speed centrifugal type clarifier such as the Sharpless centrifuge. I may effect the clarification by adding to the pectin solution while in the evaporator, a medium on which the precipitate may coagulate, such for example, as infusorial earth. The resulting suspension is then filter-pressed, the liquor passing through the press being preferably returned for re-pressing until the effluent is bright and free from suspended matter.

For some purposes, a nearly colorless pectin is desired and I have found that to produce such product, it is advantageous to employ green apples rather than red apples and where such nearly colorless pectin is to be obtained, the pectin solution is subjected to the action of finely divided absorbent carbon, such as that described in my Patent No. 1,133,049 instead of infusorial earth.

The use of finely divided absorbent carbon in the evaporator is of particular advantage in that in general, in the manufacture of apple jellies, the more nearly colorless the jelly, the higher its quality and value and by the employment of absorbent carbon in the evaporator, as described, I am able to produce a more nearly colorless pectin than has heretofore been obtained.

The resultant pectin solution is packaged and marketed, the degree of concentration of the solution depending upon the density at which the product is to be marketed. When mixed with sugar and heated, it readily produces a high grade apple jelly.

Other fruits, when similarly treated yield pectin solution. Apples, however, offer in this connection, the largest field for the process.

The pectin solutions on the market are dark colored and cloudy in appearance and in consequence produce cloudy jellies. This disadvantage I have been able to overcome by treating the fruit or fruit peelings in the particular manner described.

The process can be advantageously employed in connection with tropical fruit such as guavas, the resulting guava pectin being shipped north and later made into guava jelly, thus avoiding the shipping of the more difficultly transportable guava jelly.

While I have described in detail the preferred practice of my process, it will be understood that my invention is not limited to the exact details set forth and that the process may be variously modified without departing from the spirit of my invention or the scope of the subjoined claims.

Having thus described my invention, I claim:

1. The herein described process which consists in heating a mixture of fruit and substantially an equal weight of water to a temperature of approximately 125° C., separating the fibrous matter from the resulting mush, and subjecting the resulting solution simultaneously to concentrating and clarifying operations.

2. The herein described process which consists in heating a mixture of fruit and water to a temperature materially above 100° C., separating the fibrous matter from the resulting mush, adding to the resulting solution divided material on which the coagulatable content of the solution may coagulate, evaporating the solution in the presence of such material and separating the resulting solution therefrom.

3. The herein described process which consists in heating fruit and water to a temperature materially above 100° C., separating the fibrous matter from the resulting mush, adding finely divided absorbent carbon to the resulting solution, concentrating the solution in the presence of such carbon, and separating the resulting solution from such carbon.

4. The herein described process which consists in heating fruit and substantially an equal weight of water to a temperature of approximately 125° C., for several minutes, separating the fibrous material from the resulting mush, adding finely divided absorbent carbon to the resulting solution, evaporating such solution at a pressure less than atmospheric pressure, and separating the concentrated solution from the absorbent carbon.

In testimony whereof I affix my signature in presence of two witnesses.

RALPH H. McKEE.

Witnesses:
   CHARLES F. CLAAR,
   FREDERIC W. ERB.